United States Patent [19]

Brooks et al.

[11] Patent Number: 4,575,385

[45] Date of Patent: Mar. 11, 1986

[54] PERMEATION MODIFIED GAS SEPARATION MEMBRANES

[75] Inventors: Albert A. Brooks, St. Louis, Mo.; Joel R. Fried, Cincinnati, Ohio; Jay M. S. Henis, Creve Coeur, Mo.; Anthony Zampini; Daniel Raucher, both of St. Louis, Mo.

[73] Assignee: Monsanto Company, St. Louis, Mo.

[21] Appl. No.: 509,843

[22] Filed: Jun. 30, 1983

[51] Int. Cl.$^4$ .................................. B01D 53/22
[52] U.S. Cl. ..................................... 55/158; 55/528; 210/500.2
[58] Field of Search .................. 55/158, 16, 524; 428/304.4, 306.6, 308.4, 310.5, 318.4; 210/500.2

[56] References Cited

U.S. PATENT DOCUMENTS

| | | | |
|---|---|---|---|
| 3,373,056 | 3/1968 | Martin | 428/439 |
| 3,616,607 | 11/1971 | Klass et al. | 55/16 |
| 3,657,113 | 4/1972 | Stancell et al. | 210/23 |
| 3,762,136 | 10/1973 | Kimura | 55/158 |
| 3,775,308 | 11/1973 | Yasuda | 210/23 |
| 3,822,202 | 11/1972 | Hoehn | 55/158 |
| 3,899,309 | 8/1975 | Hoehn et al. | 29/16 |
| 3,980,456 | 9/1976 | Browall | 55/158 |
| 4,157,960 | 6/1979 | Chang et al. | 55/158 |
| 4,230,463 | 10/1980 | Henis et al. | 55/16 |
| 4,243,701 | 1/1981 | Riley et al. | 427/439 |
| 4,286,015 | 8/1981 | Yoshida et al. | 428/306.6 |
| 4,351,860 | 9/1982 | Yoshida et al. | 428/306.6 |
| 4,378,400 | 3/1983 | Makino et al. | 55/158 |
| 4,440,643 | 4/1984 | Makino et al. | 55/158 |
| 4,470,831 | 9/1984 | Hirose | 428/447 |

FOREIGN PATENT DOCUMENTS 1081361 9/1967 United Kingdom ................ 53/22

OTHER PUBLICATIONS

Journal of Membrane Science, McCandless, vol. 1 (1976) 333–353, vol. 2 (1977) 375–389, vol. 6 (1980) 259–263.
Polymer Engineering and Science, Robeson, Jul. 1969, vol. 9, No. 4, pp. 277–281.
Hwang, et al, Techniques of Chemistry, vol. VII, Membranes in Separations, Chapter 12, John Wiley & Sons, 1975.
Polymer Engineering and Science, Takayuki Murayama, Aug. 1982, vol. 22, No. 12, pp. 788–791.
PB 81-147787 (NTIS) Final Report submitted to OWS&T, U.S. Department of Interior (Cabasso).
PB 82-103920 (NTIS) Final Report submitted to OWS&T, U.S. Department of Interior (Cabasso).

Primary Examiner—George F. Lesmes
Assistant Examiner—William M. Atkinson
Attorney, Agent, or Firm—Henry Croskell

[57] ABSTRACT

Asymmetric gas separation membranes of polymeric materials having selective permeation of at least one gas of a gaseous mixture over that of one or more remaining gases of the gaseous mixture, exhibit improved permeation selectivities for the at least one gas when the asymmetric membranes have been contacted on one or both surfaces with an effective amount of a permeation modifier. The permeation modified asymmetric gas separation membrane having an effective amount of permeation modifier added in a non-homogeneous mode and without loss of Tg.

5 Claims, No Drawings

PERMEATION MODIFIED GAS SEPARATION MEMBRANES

BACKGROUND OF THE INVENTION

This invention relates to permeation modified asymmetric gas separation membranes which exhibit improved gas separation selectivity and the process to produce such an improved asymmetric gas separation membrane. In another aspect, the invention relates to processes utilizing permeation modified membranes for improved selectivity in the separation of at least one gas from a gaseous mixture by permeation.

The separating, including upgrading of the concentration of at least one selective gas from a gaseous mixture, is an especially important procedure in view of the demands and the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation, the membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture. However, in order for selective separation of the one or more desired gases by the use of separation membranes to be technically feasible the membranes must satisfy several criteria so that the use of the separation procedure has utility. For instance, the membranes must be capable of withstanding the conditions to which they may be subjected during the separation operation. The membranes must also provide an adequately selective separation of one or more desired gases at a sufficiently high flux, that is, permeation rate of the permeate gas per unit surface area. Thus, separation membranes which exhibit a high flux but low selectivity separation are unattractive as they require large separating membrane surface area. Similarly, separation membranes which exhibit adequately high selective separation but undesirably low fluxes are also lacking in practical use feasibility. Furthermore, membranes which are not capable of maintaining the desired performance of flux and selectivity over an extended period of time in adverse operating environments are likewise undesirable. Adverse environmental conditions include extremes of temperature, pressure and concentration of chemical contaminants. Accordingly, research has continued to develop gas separation membranes which provide improved performance regarding the separation of one or more desired gases for an extended period of time under adverse environmental conditions.

The passage of gas through a membrane can proceed through pores, i.e. continuous channels for fluid flow and communication with both feed and exit surfaces of the membrane (which pores may or may not be suitable for separation by Knudsen flow or diffusion); in another mechanism, in accordance with current views of gas separation membrane theory the passage of a gas through the membrane may be by interaction of a gas with a material of the membrane. In this latter postulated mechanism, the permeability of a gas through a membrane is believed to involve the solubility of the gas in the membrane material and the permeability constant for single gas is presently viewed as being the product of the solubility and diffusiveness of the gas in the membrane. A given membrane material has a particular permeability constant for passage of the given gas by the interaction of the gas with the material of the membrane. The rate of permeation of the gas, i.e. flux through the membrane is related to the permeability constant, but is also influenced by variables such as the membrane thickness, the physical nature of the membrane, the partial pressure differential of the permeate gas across the membrane, the temperature and the like.

In general, efforts have been directed at providing material of a gas separation membrane in as thin a form as possible in view of the low permeabilities of most membrane materials in order to provide adequate flux while providing a membrane as pore-free as possible such that gases are passed through the membrane by interaction with the material of the membrane. One approach for developing separation membranes suitable for gaseous systems has been to provide composite membranes having the thinnest possible superimposed membranes supported on an anisotropic porous support where the superimposed ultrathin membrane provides the desired separation. The superimposed membranes are advantageously sufficiently thin, i.e. ultrathin, to provide reasonable fluxes. The essential function of a porous support is to support the superimposed membrane. Suitable supports are desirably porous to provide low resistance to permeate passage after the superimposed membrane has performed its function of selectivity separating the permeate from the feed mixture. Klass et al, U.S. Pat. No. 3,616,607; Stancell et al, U.S. Pat. No. 3,657,113; Yasuda, U.S. Pat. No. 3,775,308; and Browall, U.S. Pat. No. 3,980,456 exemplify gas separation membranes having superimposed thin membranes on a porous support.

Such composite membranes for gas separations have not been without problems. For instance, Browall discloses that in the fabrication of composite membranes of ultrathin films, fine particles, particles below about 3,000 angstroms in size, may be deposited under or between preformed ultrathin membrane layers and because of their large size in comparison to the ultrathin membranes, puncture the ultrathin membranes. Such breaches reduce the selectivity and thus the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membranes and the porous polycarbonate support as an adhesive. Thus, the composite membranes of Browall are complex in materials and techniques of construction.

A major improvement in gas separation membranes is disclosed by Henis et al in U.S. Pat. No. 4,230,463 which pertains to particular multicomponent membranes for gas separations comprising a coating in contact with the porous separation membrane wherein the separation properties of the multicomponent membranes are principally determined by the porous separation membrane as opposed to the material of the coating. Such multicomponent membranes for the separation of at least one gas from a gaseous mixture can exhibit a desirable selectivity and still exhibit a useful flux. Moreover, such multicomponent membranes for gas separation can be fabricated from a wide variety of gas separation membrane materials which are advantageous for a given gas separation. The desired combination of flux and selectivity of separation can be provided by the configuration and methods of preparation and combinations of the components. For instance, material having high selectivity of separation but a relatively low permeability constant can be utilized to provide multicomponent membranes having desired permeation rates and desired selectivity of separation through utilization of a porous substrate which contributes to the overall separation efficiency of the multicomponent membrane.

Research efforts continue in the field of gas separation membrane technology to reach economic gas separation performance utilizing asymmetric membranes of materials which have intrinsically high separation selectivity for gases such as hydrogen, carbon dioxide and the like. Attempts to eliminate surface porosity of these membrane materials in an asymmetric state by using either spinning or post treatment techniques have generally resulted in membranes, particularly hollow fiber membranes, that have poor performance gas separations either in low flux or low selectivities or both. With hollow fiber gas separation membranes spun from polymeric materials having high intrinsic selectivities for gas separations such as polyphenylene oxides, substituted polyphenylene oxides, polyimides, polyamides, polysulfones, polyethersulfones, cellulose esters, and the like, these treatments have produced modified fibers with uncoated separation properties of interest compared to those of multicomponent coated polysulfone fibers. The separation of gas mixtures by these and other peameable membranes is commercially feasible because of recent advances in membrane technology. Broader application of this technology can be achieved if membranes can be perfected which separate gas more efficiently. One measure of membrane efficiency is the gas separation factor which is the ratio of the permeability constant of one gas to the permeability constant of another gas. Any modification of a membrane which increases the gas separation factor improves the membrane efficiency.

Agents used to alter membrane permeability are called permeation modifiers. The mechanism by which permeation modifiers work is not fully understood but it is believed that it varies depending upon the nature of the modifier, the composition of the membrane and the particular gases involved.

Various permeation modifiers are known. For example, trimethylamine or thiourea alter the permeability and separation factor of brominated poly(xylene oxide) membranes, Henis and Tripodi U.S. Pat. No. 4,230,463. N-ethyl o,p-toluenesulfonamide (SANTICIZER ® 8 plasticizer) modification of polyester/polyamide membrane increases the $H_2/CH_4$ separation factor, Holhn and Richter, U.S. Pat. No. 3,899,309.

The selectivity of PVC membrane for carbon dioxide is enhanced by incorporation of ester plasticizer, e.g. dialkylphthalates, sebecates, fumarates, stearates, glycerol triacetate, and triphenyl phosphate, British Pat. No. 1,081,361. McCandless et al describe the use of sulfolene, 3-methylsulfolene, 1-methyl-2-pyrrolidinone, morpholine, triethanolamine, etc., as permeation modifiers, Journal of Membrane Science, Vol. 1 (1976) 333-353, Vol. 2 (1977) 375-389, Vol. 6 (1980) 259-263. Robeson describes $CO_2$ permeability changes of polysulfone by antiplasticizers, e.g., chlorinated biphenyl, N-phenyl-2-napthylamine, and 4,4'-dichlorodiphenylsulfone, Poly. Eng. & Sci., July 1967, Vol. 9, No. 4, pp. 277-281. However, the quest for better permeation modifiers continues.

SUMMARY OF THE INVENTION

The invention provides gas separation membranes comprised of permeation modified asymmetric membranes exhibiting improved gas separation selectivity. A preformed asymmetric gas separation membrane of polymeric material having selective permeation of at least one gas of a gaseous mixture over that of one or more remaining gases of the gaseous mixture has been found to exhibit improved separation factors for the permeating gases after being contacted on one or both surfaces with an effective amount of a permeation modifier. The asymmetric gas separation membrane is permeation modified in a non-homogeneous mode, i.e. thin surface modification without overall loss of glass transition temperature $T_g$. The invention also provides for a process to produce the improved flat, tubular, or hollow fiber asymmetric membranes having enhanced gas separation properties. It has been discovered that treating asymmetric membranes with permeation modifiers results in a modified asymmetric membrane having uncoated separation properties significantly greater than the separation factor exhibited by the asymmetric membranes before permeation treatment

DEFINITION OF TERMS

Separation factor ($\alpha a/b$) for a membrane for a given pair of gases a and b is defined as the ratio of the permeability constant ($P_a$) of the membrane for gas a to the permeability constant ($P_b$) of the membrane for gas b. Separation factor is also equal to the ratio of the permeability ($P_a/l$) of a membrane of thickness l for gas a of a gas mixture to the permeability of the same membrane to gas b, ($P_b/l$) wherein the permeability for a given gas is the volume of gas, standard temperature and pressure (STP), which passes through a membrane per square centimeter of surface area, per second, for a partial pressure drop of one centimeter of mercury across the membrane per unit of thickness, and is expressed as $P/l = cm^3/cm^2\text{-sec-cmHg}$.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors are disclosed by Hwang et al, Techniques of Chemistry, Volume VII, "Membranes in Separations", John Wiley & Sons, (1975) (herein incorporated by reference) at Chapter 12, pages 296 to 322.

Dense or compact membranes are membranes which are essentially free of pores, i.e. fluid flow channels communicating between the surfaces of the membrane and are essentially free of voids, i.e. regions within the thickness of the membrane which do not contain the material of the membrane. The dense membrane is essentially the same throughout the structure, therefore it falls within the definition of isotropic membrane. On the other hand, porous separation membranes relate to membranes having continuous channels for fluid flow which communicate between the feed surface and the exit surface. Porous regions of such membranes can also extend from the surface skin or compact surface through approximately 90 to 99% of the total membrane thickness. The remaining dense region extends to the opposite surface. Asymmetric membranes have considerable internal void volume; however, this volume is not related to continuous porosity from one side of the membrane to the other. Asymmetric membranes have at least one skinned surface, i.e. a compact layer that is at an internal or external surface which is generally on one or both faces of the membrane.

For purposes of this invention a permeation modifier is defined as any material which increases separation factor of any asymmetric gas separation membrane when contacted in an effective amount on one or both surfaces of the membrane, the membrane modification being accomplished without loss of membrane $T_g$. The increased separation factor resulting from the effective amount of permeation modifier is greater than the intrinsic separation factor of the material comprising the asymmetric gas separation membrane.

Determination of $T_g$ (glass transition temperature of polymers) is set out by a paper prepared by Takayuki Murayama in *Polymer Engineering and Science,* August 1982, Volume 22, Number 12, pages 788 through 791. The paper entitled "Determination of Glass Transition of Polymer by the Autovibron" provides the basis for $T_g$ measurements indicated describing this invention wherein the properties of polymers as they change with temperature and wetness were measured. The automated Rheovibron (Autovibron) has been useful in determining the glass transition behavior of polymers and the aforementioned paper is incorporated by reference herein for the purposes of describing how $T_g$ temperatures were achieved. The glass transition of polymers can be determined by substantial or abrupt changes in coefficients of thermal expansion for the amorphous polymers in the region of glass transition. The temperature at this abrupt change is defined as the glass transition temperature, $T_g$.

An "effective amount" of permeation modifier as referred to herein is used in relation to the amount of modifier contacted with the asymmetric gas separation membrane. This effective amount can be varied by factors such as modifier concentrations, time of exposure, temperature and the like. An effective amount is herein defined as that modifier contact amount sufficient to improve the asymmetric gas separation membrane selectivity but insufficient to impair the mechanical integrity, strength, or other physical properties of the polymer which are detrimental to the function of the polymeric membrane as a gas separator.

DESCRIPTION OF THE PREFERRED EMBODIMENTS

Attempts to eliminate surface porosity of asymmetric gas separation membranes or even composite or multi-component membranes have utilized spinning techniques relative to hollow fiber membranes and/or post treatment techniques in order to improve asymmetric membrane performance. Generally, these treatment techniques have resulted in fibers that have economically poor gas fluxes or selectivities when, in fact, an improvement in both or at least a substantial improvement in one without seriously deterring the other is desired. Hollow fibers spun from relatively good permeation polymers have been modified in various ways but without achieving significant improvement in the fluxes or selectivites for gas separations. We have found that the treatment of asymmetric membranes either flat or hollow fiber in form with preferably a permeation modifier offers significant improvement in the asymmetric membrane gas selectivity. Permeation modification of preformed membranes provides a simple route to improving gas separation membrane performance to such a level that uncoated hollow fibers perform at separation levels up to and greater than the intrinsic selectivity of the polymer from which the fiber is spun.

The material used for the asymmetric separation membrane may be a natural or synthetic substance having useful gas separation properties. In the case of polymers, both addition and condensation polymers which can be cast, extruded or otherwise fabricated to provide asymmetric separation membranes are included. The asymmetric separation membranes can be prepared, for example, by casting from a solution comprised of a good solvent for the polymeric material into a poor or nonsolvent for the material. The spinning and/or casting conditions and/or treatments subsequent to the initial formation and the like can influence the porosity, i.e. the asymmetry and resistance to gas or fluid flow of the porous separation membranes.

Generally organic polymers, mixtures of organic polymers, or organic polymers mixed with inorganics are used to prepare the asymmetric separation membrane. Typical polymers suitable for the asymmetric separation membrane according to the invention can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc; polysulfides; polymers from monomers having alpha-olefinic unsaturation other than mentioned above such as poly(ethylene), poly(propylene), poly(butene-1), poly(4-methyl pentene-1), polyvinyls, e.g. poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts an blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Selection of the asymmetric separation membrane for improved gas separations may be made on the basis of heat resistance, solvent resistance, mechanical strength of the asymmetric separation membrane, as well as other factors indicated by the operating conditions for selective permeation, as long as the asymmetric separation membrane has the prerequisite relative separation factors in accordance with the invention for at least one pair of gases.

In making asymmetric hollow filament separation membranes, a wide variety of spinning conditions may be employed. These methods are disclosed, for example, in the preparation of polysulfone hollow filaments by Cabasso et al in Research and Development of NS-1 and Related Polysulfone Hollow Fibers for Reverse Osmosis Desalination of Seawater, supra. In addition, methods taught for preparing the porous separation membrane as disclosed in U.S. Pat. No. 4,230,463 are appropriate for preparing the preformed asymmetric separation membranes which when contacted with effective amounts of a volatile solvent result in improved asymmetric gas separation membranes.

One simple method for contacting and modifying the asymmetric membranes with a permeation modifier is to dip coat, for example the asymmetric hollow fiber membranes, with the permeation modifiers at varying concentrations and temperatures. In order to achieve an effective amount of the modifier contact with the asymmetric membranes, these contacts must be considered independently depending on the materials comprising the permeation modifiers being used, whether in concentrate liquid or vapor phase and the polymeric materials comprising the asymmetric membrane.

Permeation modifiers according to the invention can be selected from materials which are removable from the asymmetric gas separation membrane after contact treatment, i.e. volatile solvents, acids, bases, and the like. Permeation modifiers can also be selected from materials which perform as antiplasticizers in the effective amount range, these modifiers generally remaining in the surface zone of the membranes.

Preferably, hollow fiber permeable membranes are first prepared in the conventional manner. The hollow fiber membrane is then immersed in a solution containing a permeation modifier. Preferably, the membrane is essentially insoluble in the solvent for the permeation modifier. Contact with the solution of permeation modifier is continued until the desired amount of permeation modifier is absorbed by the separation membrane. The contact time may be as long as one hour or more, but typically contact times of about 1–10 minutes are sufficient. The longer contact times result in greater absorption of the permeation modifier. One advantage of treating a preformed hollow fiber is that the permeation modifier is rapidly absorbed by the membrane with relatively little absorption of the permeation modifier by the bulk of the polymeric material of the hollow fiber. Thus, the total weight of permeation modifier absorbed generally will be less than about one weight percent upon the total weight of the fiber, but the concentration of permeation modifier in the separation membrane portion (thin outer skin) of the fiber can be considerably higher, for example, about 10 to about 20 weight percent. Of course, it is understood that the separation membrane of a hollow fiber consists essentially of the thin outer skin of the fiber with the remainder of the material providing a porous support for the separation membrane. Thus, in a preferred embodiment of the invention, only the membrane portion of the hollow fiber is modified. The hollow fber comprising the modified permeable membrane of this invention may be coated as described in U.S. Pat. No. 4,230,463. Preferably, the hollow fiber membrane is modified prior to coating but it is feasible to modify the separation membrane either simultaneously while coating the fiber or after the coating is applied.

The amount of permeation modifier varies depending upon the nature of the polymeric material and the degree of permeation selectively desired. Changes in separation factor may be achieved over a wide range of proportions of permeation modifier to polymeric material of the permeable membrane. Satisfactory amounts of permeation modifier include from about 0.01 to about 1.0 weight percent modifier based on the weight of polymeric material of the membrane. When preparing a modified membrane by casting, the above-described amounts of permeation modifier are dissolved in the casting solution. When modifying a preformed hollow fiber membrane, the concentration of the treating solution containing the permeation modifier or the time of exposure to the treating solution is controlled so that the separation membrane portion of the hollow fiber absorbs the effective amount of permeation modifier.

One embodiment of the invention is an apparatus for selectively separating at least one gas in a gaseous mixture, which apparatus comprises an enclosure and a gas permeable membrane dividing the enclosure into a feed gas portion and a permeant gas portion, said membrane having a feed gas surface and an opposite permeant gas exit surface, said enclosure having means for supplying a gaseous mixture to the gas feed surface, means for removing gas depleted of permeant gas from the vicinity of the feed surface, and means for removing permeant gas from the vicinity of the exit surface, in which the membrane is modified by a permeation modifier of the invention.

Another embodiment of the invention is a method for separating at least one gas of a gaseous mixture from at least one other gas in the mixture by selective permeation which comprises supplying a feed gaseous mixture to a feed surface of a gas permeable membrane, permeating a portion of the gaseous mixture through the membrane, removing from the vicinity of the permeant surface of the membrane a permeant gas enriched in at least one gas of the gaseous mixture, and removing from the vicinity of the feed surface a gas enriched in at least one other gas of the feed gaseous mixture, in which the gas permeable membrane is modified by a permeation modifier of the invention.

The modified membranes of the invention are especially suited for gaseous mixtures comprising hydrogen, carbon monoxide, carbon dioxide, helium, nitrogen, oxygen, argon, hydrogen sulfide, nitrous oxide, ammonia, and hydrocarbon gases of 1 to about 5 carbon atoms, for example, methane, ethane, and propane. The modified membranes are particularly suitable for separating hydrogen from gaseous mixtures containing any of the aforementioned gases. The modified membranes are particularly effective for a gas mixture comprising two or more gases, one of which being selected from hydrogen, helium, ammonia and carbon dioxide and the other being selected from carbon monoxide, nitrogen, argon, methane and ethane.

The modified membranes of the invention are particularly useful for separating hydrogen from carbon monoxide, carbon dioxide from hydrocarbon gases such as methane and ethane, oxygen from air, ammonia from hydrogen, nitrogen, methane or argon singly or together, carbon dioxide from carbon monoxide, hydrogen sulfide from hydrocarbon gases of 1-5 carbon atoms, helium from hydrocarbon gases, and carbon monoxide from hydrogen, helium, nitrogen, and hydrocarbon gases.

In accordance with one embodiment of this invention, improved porous membrane for gas separation comprising gas permeable polymeric material is obtained by modifying said polymeric material, in an effective amount to increase the gas separation factor of the asymmetric membrane, by a permeation modifier of the formula

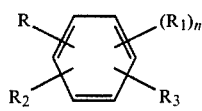 (a)

in which n is one to three, R and $R_1$ independently are hydroxy, chloro, bromo, amino, alkylamino, dialkylamino, nitro, alkoxy, hydroyxalkyl, hydroxyalkoxy, carboalkoxy, carboalkyl, or glycidyloxy, and $R_2$ and $R_3$ independently are hydrogen or alkyl or of the formula

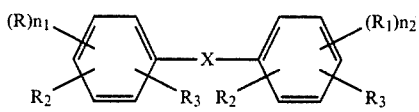 (b)

in which R, $R_1$, $R_2$, $R_3$ are the same as before, X is oxygen, sulfur, dithio, carbonyl, alkylene or cycloalkylene, and $n_1$ and $n_2$ are zero to three with the proviso that the sum of $n_1$ and $n_2$ is at least two.

These permeation modifiers can be selected from benzene, benzophenone, diphenylether, diphenylsulfide, diphenyldisulfide, diphenylalkane, and diphenylcycloalkane substituted with at least two polar groups and optionally with alkyl groups. Satisfactory alkylene bridging groups of the diphenylalkane compounds include straight or branched chain alkylene radicals of 1-12 carbon atoms with alkylene radicals of 1-6 carbon atoms being preferred. Suitable cycloalkylene bridging groups include cycloalkylene radicals of 5-8 carbon atoms with cyclohexylene being preferred. Suitable alkyl radicals, either directly attached to the benzene ring or comprising a part of alkoxy, alkylamino, or diamino radicals, include straight or branched alkyl radicals of 1-12 carbon atoms. Primary and secondary alkyl radicals are preferred with lower alkyl radicals of 1-5 carbon atoms being more preferred.

Illustrative examples of satisfactory permeating modifiers of formula (a) are 3-bromophenol, 2,6-dibromophenol, resorcinol, 4-chlorophenol, 4-nitrophenol, 4-aminophenol, 1-bromo-4-nitrobenzene, 4-chloroaniline, 4-nitroaniline, 1-bromo-4-chlorobenzene, catechol, 2,6-dichlorophenol, 2,6-dinitrophenol, 4-methoxyphenol, 1-chloro-2-nitrobenzene, 1,4-phenylenediamine, N,N'-bis(1,4-dimethylpentyl)-paraphenylenediamine, N,N-bis(isopropyl)paraphenylenediamine, N,N'-bis(methyl) paraphenylenediamine, 2,5-di(tert-amyl)hydroquinone, N,N'-bis(1-methylheptyl)paraphenylenediamine, 1,4-dinitrobenzene, 2,6-dibromophenoxy acetic acid, 2,4-bibromophenoxy acetic acid, 2-aminobenzoic acid, 4-aminobenzoic acid, 1,3-benzenedicarboxylic acid, and 1,4-benzenedicarboxylic acid.

Illustrative examples of satisfactory permeation modifiers of formula (b) are 4,4'-diaminobenzophenone, 2,2'-diaminobenzophenone, 2',4-diaminobenzophenone, 4,4'-dimethylaminobenzophenone, 4,4'-dichlorobenzophenone, 4,4'-dibromobenzophenone, 4,4'-dinitrobenzophenone, 2,2'-dinitrobenzophenone, 2,4,-trihydroxybenzophenone, 3-phenoxy-1,2-benzenediol,4-phenoxy-1,3-benzenediol, 4(4-hydroxyphenoxy)1,3-benzenediol, 2(4-hydroxyphenoxy)1-hydroxy-5-methoxybenzene, 1,1'-oxybis(2-hydroxy-4-methoxybenzene), 1,1'-oxybis(3,5-dichloro-4-hydroxybenzene), 4(phenoxy)2,6-dichlorophenol, 2(2,5-dichlorophenoxy)benzeneamine, 3(4-chlorophenozy)nitrobenzene, 4(2,5-dichlorophenoxy)nitrobenzene, 1,1'-oxybis(4-chlorobenzene), 1,1'-oxybis(4-methoxybenzene), 1,1'-thiobis(2,4-dihydroxybenzene), 4(4-hydroxyphenylthio)-1,3-benzenediol, 1,1'-oxybis(2,4-dihydroxybenzene), 1,1'-thiobis(2,4-dihydroxybenzene), 1,1-oxybis(4-nitrobenzene), 1,1'-thiobis(4-nitrobenzene), 4-4'oxybis-(N-methylbenzeneamine, 4,4'-thiobis(6-tert-butyl-m-cresol), 4,4'-thiobis(benzeneamine), and corresponding dithio compounds.

Additional examples include 2-methyl-4[(4-methylphenyl)methyl] 1,3-benzenediol, 4(1-methyl-1-phenylethyl) 1,2-benzenediol, 4,4'-(1-methyl-1,2-ethanediyl)di phenol, 2-(3-aminophenylmethyl)benzeneamine, 1-chloro-2(4-chlorophenoxy)benzene, 1,3-dichloro-2-phenoxy-benzene, 4,4'-butylidenebis(6-tert-butyl-m-cresol), 2,4-dichloro-1-phenoxy-benzene, and 1,1'-oxybis(2-chlorobenzene).

Modified permeable membranes of the invention are illustrated in the tables. A polysulfone having a linear chain of the general formula

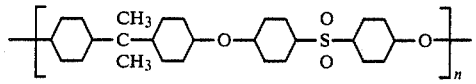

where n is about 50 and 80, sold under the tradename P-3500 by Union Carbide, is dissolved in N-methylpyrrolidone to obtain a solution containing about 20 to 35 weight percent of polymer.

Hollow fiber membranes modified in accordance with the invention are illustrated in Tables 1 and 2. The hollow fiber comprises polysulfone (Union Carbide, P-3500) spun as described in U.S. Pat. No. 4,230,463. Multicomponent membranes of the aforesaid patent are prepared by coating with silicone rubber (Dow Corning-Sylgard 184). In Table 1, modified multicomponent membranes are prepared via a two-step process. In the first step, the hollow fiber is treated with permeation modifier and in the second step the hollow fiber is coated with silicone rubber. In Table 2, modified multicomponent membranes are prepared via a single step process comprising of contacting the hollow fiber with a solution containing both the permeation modifier and silicone rubber.

In Table 1, hollow fiber membrane is dipped for about ten seconds in a methanol or aqueous methanol solution containing two weight percent of permeation modifier, while a vacuum is applied to the bore of the hollow fiber. The modified hollow fiber membrane is then dipped for about ten seconds in a pentane solution containing one weight percent of silicone rubber, while a vacuum is applied to the bore of the hollow fiber. The fiber is removed from the dip solution, the vacuum is broken and the solvent is allowed to evaporate. The data for four different bis phenol modifiers is shown in Table 1. Sample 1 is a control coated with silicone rubber, but not treated with a permeation modifier. The data shows that the methyl substituted his phenol A compound, sample 3, to be the most effective.

In Table 2, hollow fiber membrane is dipped for about ten seconds in a solvent containing permeation modifier and silicone rubber, while a vacuum is applied to the bore of the hollow fiber. The fiber is removed from the dip solution, the vacuum broken, and the solvent is removed by evaporation. The composition of the treating solution is shown in the table. Stocks 1 and 2 are controls of multicomponent hollow fiber membrane treated with silicone, rubber alone. The data indicates that 1,2-oxy-3(2,4-dibromophenoxy) propane is a superior permeation modifier.

The procedure for measuring gas permeabilities and separation factors is as follows: A disc of dried film of known surface area is placed in a test cell and a gas mixture cnsisting, for example, about 25% carbon monoxide in hydrogen is flowed past the film on the feed (high pressure) side of the film at a constant pressure (of about 230 to 600 cm Hg). The gas flow on the feed side is maintained at a rate of 10–100 times greater than the permeation rate to insure constant composition of the feed gas mixture. The permeate side of the film is evacuated continuously until the film reaches a steady state condition which depends upon film thickness and the permeability of the gas in the polymer. After equilibration the total gas permeability is determined from the time necessary for the pressure on the permeate side of the film to increase in a known volume from a few millitorr to about 1 torr.

Accurate pressure readings are obtained using an MKS Baratron ® capacitance manometer. A sample of the permeate gas is then collected to a pressure of approximately 10 torr and injected via a gas sampling valve into a gas chromatograph to determine the permeate composition.

The total pressure in the sample loop of the gas sampling valve is measured with a capacitance manometer and the hydrogen partial pressure is determined by the difference between the partial pressures of other components (determined by GC analysis) and the total pressure. The composition of the permeate gas in combination with the rate of pressure rise is then used to calculate P. Equation (1) illustrates the calculation for determining hydrogen permeability ($P_{H2}$).

$$P_{H2} = \frac{E \cdot R \cdot l \cdot V}{760 \, A \cdot \Delta p H_2} \quad (1)$$

where R is the measured rate of pressure rise in mm/sec, E is the fraction of permeate determined to be $H_2$ by GC analysis, V is the calibrated volume into which the sample is collected in cc (STP), l is the film thickness in cm (measured using a Federal Products thickness gage), A is the film surface area, and $\Delta P_{H2}$ is the average pressure differential for $H_2$ across the film in cm Hg during the collection time.

Films are determined to be at steady state when the measured values for permeability and separation factor remained constant with time.

Separation factors are calculated from the permeate feed gas compositions by $$SF = \frac{[H_2] \text{permeate gas}}{\frac{[H_2]}{[CO]} \text{ feed gas}} \quad (2)$$

Although the invention has been illustrated by typical examples, it is not limited thereto. Changes and modifications of the examples of the invention herein chose for purposes of disclosure can be made which do not constitute departure from the spirit and scope of the invention.

TABLE 1

| Permeation Modifier | (P/l) $H_2 \times 10^5$ | $H_2$ $\alpha CO$ | % Increase in $\alpha$ |
|---|---|---|---|
| (1) None | 10 | 35 | — |
| (2) 1,1'-thiobis(4-hydroxybenzene) | 2.9 | 57 | 63 |
| (3) 4,4'-(1-methylethylidene)bis (2-methylphenol) | 4.1 | 80 | 80 |
| (4) 4,4'-(1,1-cyclohexylidene) bisphenol | 4.1 | 46 | 31 |
| (5) 4,4'-(1-ethyl-1,2-ethanediyl) diphenol | 0.6 | 38 | 9 |

TABLE 2

| Permeation Modifier | Treating Solution | (P/l) $H_2 \times 10^5$ | $H_2$ $\alpha CO$ | % Increase in $\alpha$ |
|---|---|---|---|---|
| (1) None | 1 wt. % Slygard/pentane | 10 | 35 | — |
| (2) None | 2 wt. % Slygard/2-propanol | 5.0 | 35 | — |
| (3) 1,1'-oxybis(4-bromo-benzene) | 1 wt. %/1 wt. % Slygard/pentane | 4.5 | 52 | 49 |
| (4) 1,2-oxy-3(4-t-butyl-phenoxy) propane | 1.6 wt. %/0.5 wt. % Slygard/pentane | 2.9 | 57 | 63 |
| (5) 1,2-oxy-3(2,4-dibromo-phenoxy) propane | 1 wt. %/1 wt. % Slygard/2-propanol | 1.8 | 90 | 157 |
| (6) diglycidyl ether of bisphenol A | 1 wt. %/1 wt. % Slygard/2-propanol | 3.9 | 38 | 9 |

We claim:

1. An improved non-porous asymmetric gas separation membrane comprising: a preformed non-porous asymmetric gas separation membrane material having a separation factor for one gas of a gaseous mixture over that of one or more remaining gases of the gaseous mixture, said membrane material having contacted on one or both surfaces thereof a permeation modifier in an amount effective to improve the separation factor of the membrane for said one gas over that of said remaining gases but insufficient to cause an appreciable change in the physical properties of said membrane material, said permeation modifier being selected from the formula

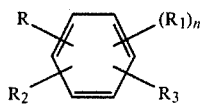

in which n is one to three, R and $R_1$ independently are hydroxy, chloro, bromo, amino, alkylamino, dialkylamino, nitro, alkoxy, hydroalkoxy, hydroxyalkyl, carboalkoxy, carboxyalkoxy, or glycidyloxy, and $R_2$ and $R_3$ independently are hydrogen or alkyl; or the formula

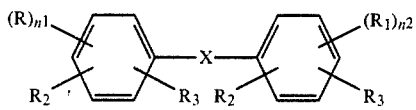

in which R, $R_1$, $R_2$, and $R_3$ are the same as in formula (a), x is oxygen, sulfur, dithio, carbonyl, alkylene, or cycloalkylene, and $n_1$ and $n_2$ are zero to three with the proviso that the sum $n_1$ and $n_2$ is at least two.

2. The non-porous asymmetric gas separation membrance of claim 1 wherein the effective amount of permeation modifier added to the preformed non-porous asymmetric separation membrane provides a permeation modified asymmetric gas separation membrane having no appreciable changes loss of $T_g$.

3. The improved permeation modified asymmetric gas separation membrane of claim 1 wherein the effective amount of permeation modifier added to the material of the membrane comprises from about 0.01 to about 1.0 percent by weight of the membrane.

4. The improved permeation modified asymmetric gas separation membrane of claim 3 wherein the concentration of the permeation modifier is higher in the thin outer skin portion of the membrane material than in the remaining portions thereof.

5. The improved permeation modified asymmetric gas separation membrane of claim 4 wherein the permeation modifier is selected from the group consisting of acids, bases, solvents, and antiplasticizing agents.

* * * * *